Sept. 22, 1970          H. T. PALS ET AL          3,529,971
                METHOD OF LYE-PEELING ONIONS
Filed July 5, 1966                          2 Sheets-Sheet 1

PRIOR ART

INVENTORS
CORNELIUS R. RIETVELD
HERBERT T. PALS
BY Hofgren, Wegner, Allen, Stellman & McCord
ATTORNEYS United States Patent Office 3,529,971
Patented Sept. 22, 1970

3,529,971
METHOD OF LYE-PEELING ONIONS
Herbert T. Pals, 16424 Cottage Grove Ave., South Holland, Ill. 60473, and Cornelius R. Rietveld, Rte. 2, Box 388, Cottage Grove Ave., Chicago Heights, Ill. 60411
Filed July 5, 1966, Ser. No. 562,589
Int. Cl. A23l 1/00
U.S. Cl. 99—103          9 Claims

ABSTRACT OF THE DISCLOSURE

Producing onions by subjecting physically unaltered onions to a caustic bath and subsequently removing neck and root portions of the onion.

This application relates to a method of processing onion bulbs, and more particularly to the method of removing the exterior protective skin layers, the root structure and the dried leaf structure of long day and short day variety onion bulbs without cutting or otherwise disturbing the structural integrity of the interior parts of the onion bulb within the protective skin layers.

The onion plant is generally made up of a bulbous base from which a root structure depends generally downwardly into the ground. The bulbous base, or simply onion bulb, is made up of a number of generally concentric sheaths, or ring-like layers, which comprise the "flesh" or "meat" of the onion plant. The onion bulb is enclosed by a number of outer protective skin layers which dry and oxidize upon exposure to the air and afford a protective casing about the flesh or meat of the onion bulb. The sheaths or layers of the onion bulb are actually the base portions of foliage leaves which rise from the base portion as a ring of tissue and project through and above the surface of the ground to form the onion leaf structure.

The onion bulbs are normally planted in rows, and in harvesting the onions, the growers will conventionally remove a portion of the leaf structure from the onion so that only about 1 to 1½ inches of the leaf structure remains on the planted onion. Since the onion bulbs bruise rather easily, and thereby may contaminate adjacent onions during later storage, the onion bulbs are taken from the ground with great care. The onion bulbs are then normally put through a sizing operation to separate the onion bulbs into groups according to their size and diameter. The sizing operation is generally carried out by utilizing spaced parallel bars. By varying the spacing between the parallel bars, the boiling onions may be separated from the pickling onions or onions for other uses. For example, onion bulbs of a diameter from 1 to 1½ inches generally occupy one group; onion bulbs of a diameter of about ½ to 1 inch are placed in a second group; and onions of a lesser diameter than ½ inch in yet a third group. Additional sizing operations may be performed if desired. The separated onions in each group may then be put into containers or fabric bags for temporary storage. As pointed out above, the protective skin layers oxidize and dry upon exposure to the air and form a tough, protective sheath or shield about the interior fleshy or meat part of the onion bulb.

Prior to utilizing the method of the present invention, the onion bulbs of a group to be processed are normally subjected to a screening operation. This operation entails placing the onion bulbs upon a vibrating screen-like structure so as to remove loosened skins, dried dirt or other debris which may have been associated with the onion bulbs during storage.

A typical onion bulb, after the completion of the above operations, is shown in FIG. 1. As is well-known, an onion bulb which has been sliced in two will reveal a number of inner ring-like layers of the onion bulb. In FIG. 1 the remaining root structure is shown at the lower part of the onion bulb, and the remaining dried lead structure is shown diametrically opposite the root structure. The protective skin layers of the onion blend into the root structure and the leaf structure at each of the opposite ends of the onion.

The method of the present invention is concerned with the removal of the root structure, the dried leaf structure and the protective skin layers while maintaining the structural integrity of the interior meat layers of the onion bulb. More particularly, referring to the onion shown in FIG. 2, the method of the present invention is concerned with removing the aforementioned parts of the onion while retaining the "plate-like" protective portion of the onion immediately adjacent the root structure and while retaining the natural and inherent tapering folds diametrically opposite the plate-like portion so as to preserve the structural integrity of the meat portion of the onion bulb.

Broadly, onions are classified in this country into short day varieties and long day varieties. The short day onion bulbs have been developed for those geographic regions which have a relatively short day so far as the amount of sunlight is concerned. This variety of onion is characterized by its thin protective skin layer, by its limited number of layers of inner flesh, and by its mild or less pungent odor. Examples of short day varieties which have been successfully processed by the herein described method are foreign and domestic Barletta, White Pearl, Crystal Wax, Eclipse, White Grano, Keystone Pickler No. 1 and Keystone Pickler No. 2, White Creole, Granex, L303 and M100.

The long day type of onion has been developed for those geographic areas which have a relatively long day so far as sunlight is concerned. This type of onion is generally characterized by its heavier protective skin layer, by its multitude of layers of inner flesh, and by its very pungent odor. Among the onion bulbs of this type which have been successfully processed by the herein described method are the White Portugal and White and Yellow Ebenezer onions.

With the method of the present invention there are a number of variable factors which must be considered by a processer skilled in this art to obtain optimum processing conditions. For example, (1) the variety of onion bulb must be considered because long day varieties have a thicker and heavier skin than do short day varieties; (2) the time of storage of the onions, i.e. the time between harvesting and processing, must be considered because the protective skin layers become drier and tougher with prolonged storage; (3) the size of the onion to be processed is also a factor; and finally (4) the strength of the caustic bath, the temperature of the bath, and the length of time the onion bulb is left in the bath are also important variables; that is, an overly strong caustic bath will increase the penetration of caustic into onion flesh, and higher temperatures and longer periods of time will tend to cause undesirable cooking of the raw onion during processing.

Heretofore in one method of the prior art the dried onion bulbs were individually and manually taken by hand and individually placed in small receptacles. The onion bulbs had to be carefully placed and oriented in respect to a set of cutting knives. One set of cutting knives was utilized to remove the dried leaf structure (thus exposing the upper fleshy interior of the onion), and the other set of cutting knives was utilized to remove the root structure, its adjacent plate-like portion, and portions of the lower fleshy part of the onion. Thus the inner fleshy onion layers were completely exposed at opposite ends of each raw onion. Furthermore, much of the edible flesh of each onion was wasted, because the cutting knives were set in a single position for all onions and the varying sizes and shapes of the onion bulbs exposed varying amounts of each onion to the cutting operation.

Following the above cutting operation, such cut or severed onion bulbs have been generally then handled or processed in at least two different manners to remove the remaining protective skin layers of each onion. In one method each onion was subjected to a caustic bath to loosen the skins. While the cut onion bulbs are in the caustic bath, the skin layers are loosened, but detrimentally to the inner onion flesh, the caustic also harmfully attacks the exposed flesh and penetrates completely from two directions into the multitude of natural paths which are present between the layers of flesh of the onion. Since the caustic solution very completely penetrates the entire interior of the onion, it has been found to be very difficult, and practically impossible, to remove the caustic in subsequent washing operations. Of course, the caustic is later neutralized, but by the time such neutralization occurs, irreparable damage by the caustic has already been completed and the structural integrity of the onion has been destroyed. As a result, adjacent fleshy layers of the onion loosen from each other; and the onion as ultimately canned or packaged takes on a soft or mushy consistency, and the fleshy layers of substantially all of such onions become disassociated from each other.

The second manner in which dually cut onions have been processed in methods of the prior art is shown in Hemmeter Pat. No. 2,445,881 and Odale Pat. No. 2,766,794. After cutting away the opposite ends of the onion bulbs, the process disclosed therein subjects the onion bulbs to a stream of gas under pressure to remove the protective skin layers. Urschel Pat. No. 2,494,914 also shows an apparatus for slicing off the opposite ends of the onion bulbs and then this patent states therein that the end portions of the onion are removed "to facilitate an easy peeling of the outer layer of the onion."

The primary object of the present invention is to provide a novel method of processing onion bulbs wherein the natural and inherent structure of each onion bulb is utilized to minimize the penetration of caustic solution into the interior of the onion bulb so as to maintain the firmness, wholeness and structural integrity of each onion bulb during subsequent processing and cooking operations and thereby provide onion bulbs for the consumer which will be firm, whole and pleasing in appearance.

Another object is to provide a new and improved method of processing onions wherein the root structure, the dried leaf structure and the outer protective skin layers are loosened and then removed simultaneously without the utilization of cutting or slicing apparatus.

A further object of the invention is to provide a new and improved method of processing onions wherein the onions are immediately introduced into a caustic bath following an initial washing operation, the caustic bath being of sufficient strength and of sufficient temperature, and the period of time in the caustic bath being of sufficient duration, to loosen substantially all of the root structures, protective skin layers and dried leaf structures from the onions being processed while at the same time maintaining the structural integrity, firmness and wholeness of those onions.

Yet another object is to provide a method of processing onions in which the time-consuming cutting or slicing step of the prior art is eliminated so as to decrease substantially the time required for processing while at the same time greatly increasing the quality of the resultant processed onions.

Other objects, features and advantages of the method of the present invention will be apparent from the following description, and from the illustrations in the accompanying drawings, in which.

Figure 4:
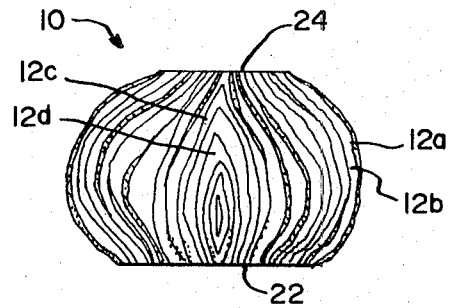
Figure 5:
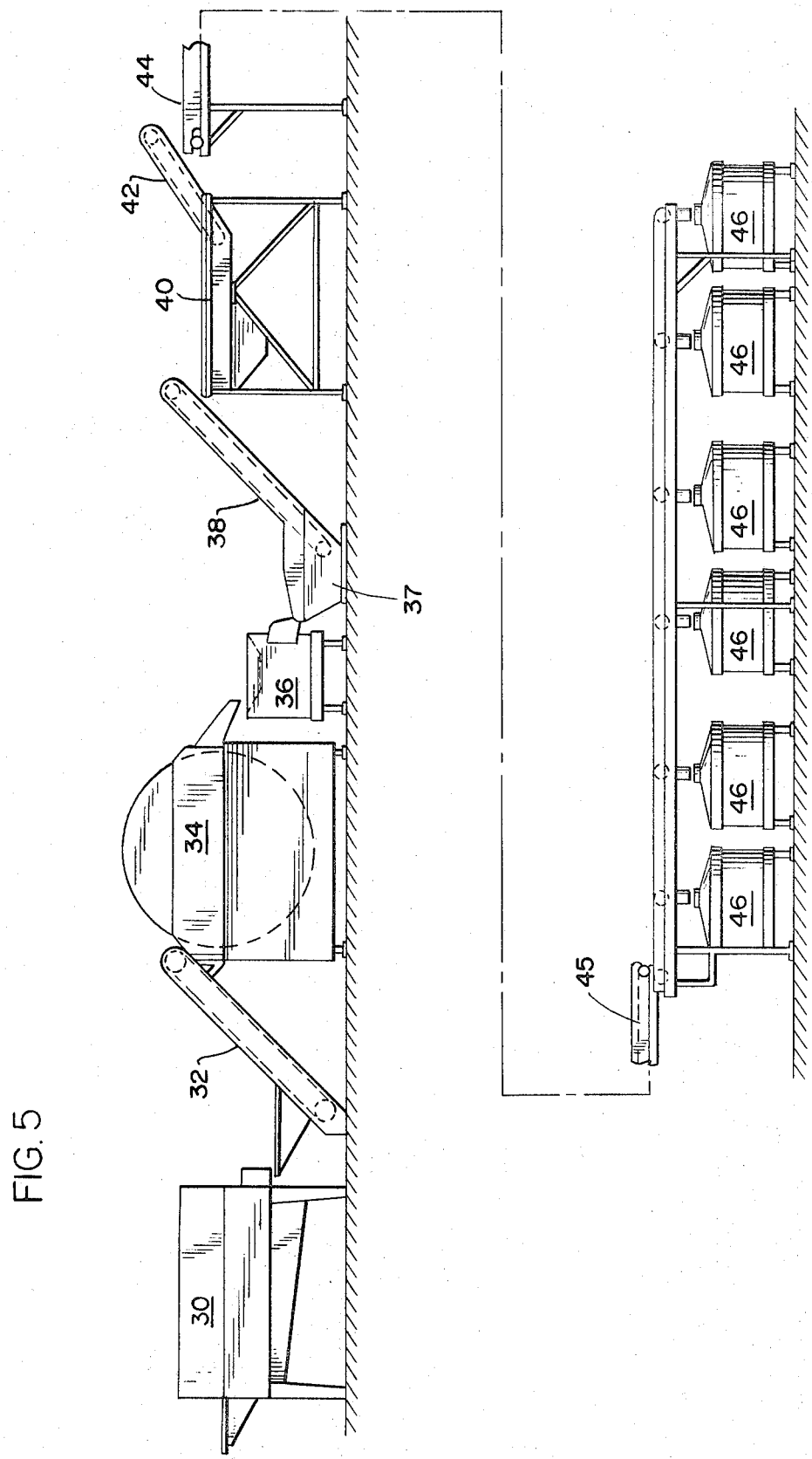

FIG. 4 is a longitudinal section view of an onion resultant from the prior art processes showing the spongy appearance, the lack of firmness and the deterioration between the onion layers causing disassociation of the layers which characteristics are attributable to penetration by the caustic bath solution; and FIG. 5 is a diagrammatic illustration of certain apparatus utilizing the steps of the process of the present invention, and showing also certain additional steps utilized in processing raw onions.

As illustrated in the drawings, the bulbous part of the onion plant 10 is made up of a number of generally concentric interior layers which afford ring-like portions or layers such as 12a, 12b, 12c, and 12d, and which comprise the flesh or "meat" of the onion. Each of these layers is actually the base portion of a foliage leaf which rises from a stem or "plate-like" portion 14 as a ring of tissue growing upwardly and projecting through and above the earth as a tubular sheath (not shown). The basic stem 14, from which all the leaves develop in a layer-like fashion, is a relatively solid fleshy portion without any readily discernible stratified or layer-like structure. The bulbous portion of the onion continually enlarges outwardly as new leaves form on the stem at the innermost portion of the onion. By maintaining the plate-like portion 14 integral with the layers 12a, 12b, 12c, and 12d during processing of raw onions, the natural and inherent structure of the onion is utilized to minimize penetration of caustic solution into the interior of the onion, and thereby to maintain the firmness, wholeness and structural integrity of the onion during subsequent processing and cooking operations so that the canned or bottled onions reaching the consumer will be firm, whole and pleasing in appearance.

Each leaf is initially provided with a blade which projects outwardly and upwardly from the sheath-like leaf at a point spaced above ground level. As the bulbs mature, the layers of leaves closest to the bulb center, such as 12c and 12d, merely become storage sheaths, and their blades never mature. These leaves whose blades never do mature do not project above ground and for the most part remain within the interior of the bulb, mostly as concentric enclosed ovoids, one within the other, and thus the bulb gradually thickens and bulges outwardly during growth.

Near the time of maturity of the bulb and subsequently during storage, a number of outermost leaf sheaths 16 dry and oxidize so as to become thin, protective skin layers which shrivel and pinch together in a neck area 18 just above the bulb to form a dried leaf structure. At about this same time, roots 20 of the root structure a the base of the stem or plate-like portion 14 gradually shrivel and shorten.

The inherent nature of the onion bulb produces tapering folds or layers at the dried leaf end of the onion bulb, and by retaining such folds intact during the process of this invention, the amount of penetration of caustic solution at the dried leaf end of the onion bulb is kept at a minimum, thus again tending to preserve the inner structural integrity of the onion.

As pointed out above, one of the initial steps in cultivation of the onion is to sever the leaf portions at about an inch to an inch and a half above ground level. The onions are then removed from the ground, including the small shriveled neck portion 18 and a root structure 20 at the base of the plate-like portion 14. It is the shriveled neck portion or remaining dried leaf structure 18 and the root structure 20 which ultimately must be removed along with the outer, tougher protective skin layers or sheaths 16 in processing raw onions.

Figure 1:
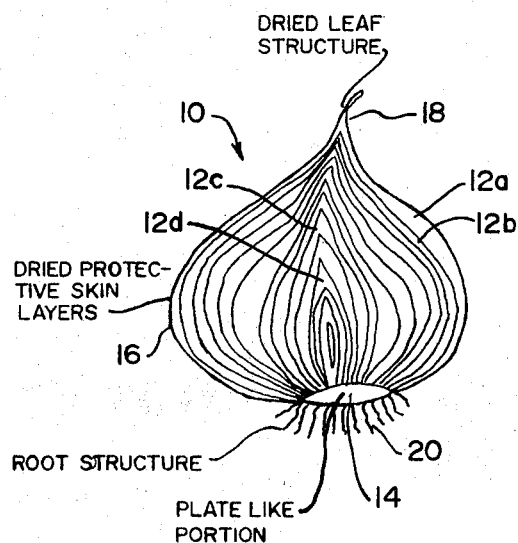
FIG. 1 is a longitudinal section view of a raw unprocessed onion as it has been harvested from the field.
Figure 3:
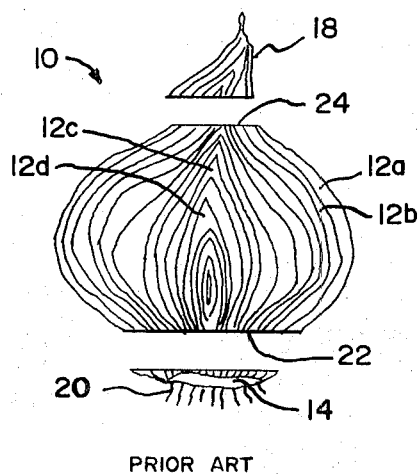
FIG. 3 is a longitudinal section view of an onion showing the first stage of cutting or slicing of an onion according to the prior art process which removed the dried leaf structure and root structure preliminary to the removal of the oute protective skin layers of the onion.

According to the methods of the prior art (see FIGS. 3 and 4), the leaf and root or stem ends of the onions were cut away from the onion along a line 22 above the stem or plate-like portion 14 at the bottom and along a line 24 inwardly of the dried leaf structure 16 (sometimes through the enclosed ovoid layers of aborted leaves at the top) to expose completely the inner flesh and concentric ring-like layer formation at opposite ends of the onion. When the onions were subsequently placed in a caustic bath for loosening and removing the outer protective skin layer, the caustic solution would readily penetrate inwardly between the layers from opposite ends of the onion and into the inner flesh or meat of the onion. Although the caustic solution in the onion was subsequently neutralized in a neutralizing bath, the caustic ingredient had already harmed permanently the texture of the onion. Thus when such onions were ultimately packaged, they had a soft or mushy texture, and the layers of inner flesh or meat of the onion readily separated from each other so that each onion disintegrated and failed to retain its inherent form and shape.

In the method of the present invention the aforementioned initial step of cutting or slicing of the dried leaf structure and of the root structure from the onion bulb is completely eliminated. The onion bulbs are initially either manually placed, or fed by conveyor, into a continuous washer mechanism 30 which agitates the onion bulbs while at the same time spraying them with water so as to remove dirt or other foreign materials which may be adhered to the onion bulbs.

After the above preliminary washing, conveyor means 32 may be utilized to feed the washed onion bulbs directly into a container 34 in which there is an alkaline solution of a conventional type, commonly referred to as a caustic bath. In the food processing field, container 34 is also commonly referred to as a lye peeler. The caustic bath is maintained at a sufficient strength by weight of caustic solute (sodium hydroxide is conventionally used), and at a sufficient temperature, and the period of time of immersion of the onion bulbs in the caustic bath is of sufficient duration, so as to loosen substantially all of the root structures, protective skin layers and dried leaf structures from the onions introduced into the bath while at the same time maintaining the structural integrity, firmness and wholeness of the inner flesh layers of the onion. As pointed out above, the plate-like portion 14 adjacent the root structure 20 prevents the caustic solution from penetrating between the inner layers of the onion at one end, while the tightly tapering folds at the other end of the onion remain undisturbed and substantially prevent any entry of the caustic solution from said other end of the onion into the inner layers of the onion. As a result, the interior of the onion is substantially completely shielded against entry of the caustic solution so that the processed raw onion, and subsequently the cooked or prepared onion for the consumer, remains intact, firm and whole.

As pointed out earlier, there are a number of variables to be considered in relation to the caustic bath so as to prevent undesirable cooking of the onion in the caustic bath and to prevent undue penetration of the caustic into the onion bulbs during immersion in the caustic bath. Thus with the particular onion bulbs to be processed, a balance need be effected of the strength of the caustic bath, the temperature of the caustic bath and the period of time of immersion in the caustic bath.

As pointed out above, the strength or concentration of the conventional caustic solution, the temperature of the solution and the time of immersion in the solution varies when processing short day variety onions as compared to long day variety onions. For short day variety onions it is preferred to use a strength of solution in the range of approximately 8% to 10% by weight of caustic solute, with a solution temperature in the range of 40° C. to 50° C., and a period of immersion of approximately five minutes duration. The concentration, the temperature and the period of time is altered somewhat for onions which have been in storage for a long period of time because the protective skin layers become somewhat drier, tougher and less penetrable by the caustic solution.

For long day variety onions, the concentration or strength of the caustic solution is preferably maintained at approximately 10% to 15% by weight of caustic solute, the temperature of the solution is maintained in a range of approximately 50° C. to 70° C., and the period of time of immersion is maintained in the range of approxmiately 10 to 15 minutes. In any event, the temperature and the time of immersion of the solution must be maintained so that there is no undesirable cooking of the onions at this stage of processing of the raw onions. Furthermore, as pointed out above, there are a number of variables which enter into this step of the method of the present invention so that some adjustments of time, temperature and solution strength may be necessary to secure optimum loosening of the dried leaf structure, the root structure and the protective skin layers.

In some instances with long day variety onions which have been in storage for a relatively long time, satisfactory processing has been carried out in accordance with this invention utilizing a strength of caustic solution of 20% by weight of caustic solute at a temperature of 55° C. with an immersion time of approximately 20 minutes.

From the caustic bath at 34, the onions are transferred into a washing apparatus 36 in which the loosened protective skin layers, root structures and dried leaf structures are substantially all removed. It is preferred to use an apparatus 36 of the "rod-reel-washer" type in which water under pressure is sprayed over agitated and tumbling onion bulbs. The washing apparatus 36 may also be of the type constructed to spin the onions so as to apply centrifugal force thereto while at the same time subjecting the onions to a washing spray or bath.

The onions are then passed out of the washing device 36 into a container 37 where they are conveyed by an elevator mechanism 38 to a stone separator tank 40 filled with water. The water is about 18 inches deep in the tank 40, and any stones or nonfloating debris will sink to the bottom of the tank while the onions float and are subsequently carried out one end of the tank 40 by means of paddles on an endless belt mechanism 42. The mechanism 42 deposits the onions upon a continuously moving inspection table 44 where the onions are again inspected and any floating debris, such as cinders or particles of wood, are manually removed from the group of onions.

Figure 2:
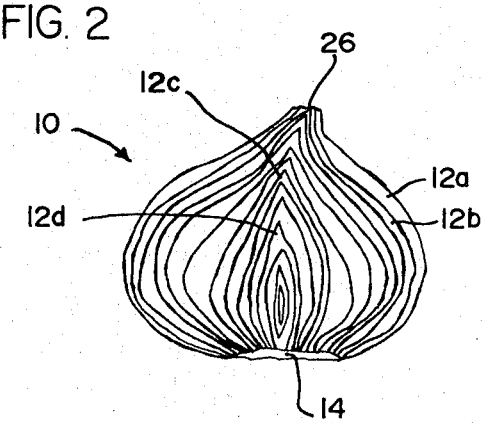
FIG. 2 is a longitudinal section view of an onion which has been processed according to the invention, retaining a whole, firm consistency and pleasing appearance, the leaf end portion having been trimmed following the onion's immersion in a caustic bath.

From the inspection table 44 the onions are divided and fed into a number of feeding conveyors 45 (herein 6) which are actually endless belts of varying lengths which carry the raw onions toward trimming machines 46. Each of the belts of the conveyor 45 leads to a separate trimming machine 46. The trimming machines are for the purpose of performing the final operation on the raw processed onions, and the machines per se form no part of this invention. However, the trimming machines are of such a nature as to trim off any projecting top of an onion as at 26 in FIG. 2, and also to remove any small portions of root structure which may have inadvertently not been removed from the bottom of any onion.

This trimming operation is in marked contrast to slicing or cutting operations described heretofore of prior art methods both as to the time of trimming and to the extent of the onion bulb removed in trimming. In other words, the trimming operation removes very little of the onion bulb, and in addition, the trimming is done after the onion bulbs have passed through the caustic solution. In contrast, the slicing or cutting of prior art methods precedes the onion bulbs being inundated in a caustic solution, and the slicing operation removes varying, but substantial portions of each onion bulb.

The method of this invention eliminates a time consuming step which was formerly thought necessary in processing raw onions. The elimination of this time consuming step greatly decreases the time required in the processing of raw onions, and in addition, the resultant raw onions produced by the present method are vastly superior to those onions heretofore produced by known prior art methods. The onion produced by the present process retains a firm consistency or texture and its structural integrity is assured when subjected to subsequent conventional canning procedures in preparing onions for the ultimate consumer. In comparison, the onion produced by prior art processes is attacked by the caustic solution throughout its edible interior, it is soft and mushy in texture, and it substantially completely disintegrates from its natural form and shape in subsequent cooking and packaging procedures so as to present an unpleasing appearance to the consumer.

Onions of the instant process have been compared with onions of the prior process utilizing comparable canning procedures. These onions are completely cooked, and even overcooked, in their respective containers to provide complete sterilization. Thus the maintenance of structural integrity of the onion in such a canning procedure has been most difficult to attain, the onions of the prior process becoming soft and falling apart; however, because of the improved onions obtained by the instant process, such onions maintain their structural integrity even in this canning procedure.

The same problem is present in the canning procedure utilized in preparing frozen onions, but not to the equivalent extent as in onions fully cooked in their container. Onions intended for freezing are initially subjected to a blanching operation, i.e., they are cooked to that degree necessary to allow them to be simply heated for serving by the consumer, and then following such blanching, the onions are frozen generally in a cream sauce in readying them for consumer use.

While the small cocktail onions and fresh onion stock are not precooked in any way, the present method has been found to preserve a firmness and wholeness to such onions which was not possible in utilizing the methods of the prior art.

The foregoing detailed description has been given for clearness of understanding only, and no unnecessary limitations should be understood therefrom, as some modifications may be obvious to those skilled in the art.

We claim:

1. The method of processing harvested onion bulbs without cutting or otherwise disturbing the structural integrity of the interior of the onion bulbs, comprising the steps of: washing the harvested onion bulbs to expose the root structures, the protective skin layers and the dried leaf structures at the neck of each onion bulb; immersing the onion bulbs without physical alteration in a caustic solution of sufficient strength and for a period of time of sufficient duration to loosen substantially all of the root structures, protective skin layers and leaf structures of each of the immersed onion bulbs, said time period being insufficient to cause undesirable cooking of the raw onion; removing a portion of the loosened root structures, protective skin layers and leaf structures from each of said onion bulbs; and washing the onion bulbs to remove the remainder of the loosened root structures, protective skin layers and leaf structures from each of said onion bulbs to provide onion bulbs whose inner structural integrity remains completely intact.

2. The method of processing harvested onion bulbs as specified in claim 1, in which the washing step is accomplished by passing the onions from the caustic solution into a container for washing, and then subjecting the onions in the container to a centrifugal washing bath to remove the remainder of the loosened root structures, protective skin layers and leaf structures from each of said onion bulbs.

3. The method of processing harvested onion bulbs as specified in claim 1, in which the immersing of the onion bulbs occurs in a caustic solution having a strength in the range of 5% to 20% of the caustic solute by weight.

4. The method of processing harvested onion bulbs as specified in claim 1, in which the temperature of the caustic solution is maintained between approximately 40° C. and 70° C.

5. The method of processing harvested onion bulbs as specified in claim 1, in which the onion bulbs are immersed in the caustic solution for a period of time in the range of approximately 5 minutes to 20 minutes.

6. The method of processing harvested onion bulbs as specified in claim 1, in which the immersing of the onion bulbs is in a caustic solution of a concentration in the range of 5% to 20% of caustic solute by weight, the caustic solution being maintained at a temperature in the range between 40° C. to 70° C., and the period of time of immersion of the onion bulbs being in the range between 5 minutes to 20 minutes.

7. The method of processing harvested onion bulbs as specified in claim 1, in which the immersing of the onion bulbs is in a caustic solution of a concentration in the range of 5% to 20% of caustic solute by weight, the caustic solution being maintained at a temperature in the range between 40° C. to 70° C., the period of time of immersion of the onion bulbs being in the range between 5 minutes to 20 minutes, and the washing stop is accomplished by subjecting the onion bulbs to a washing bath to remove the remainder of the loosened root structures, protective skin layers and leaf structures from each of said onion bulbs, and to remove substantially all of the caustic solution from said onion bulbs.

8. The method of processing short day variety harvested onion bulbs without cutting or otherwise disturbing the structural integrity of the interior of the onion bulbs, comprising the steps of: washing the short day harvested onion bulbs to expose the root structures, the protective skin layers and the dried leaf structures at the neck of each onion bulb; immersing the short day onion bulbs in a caustic solution having a concentration in the range of approximately 8% to 10% of caustic solute by weight with the temperature of the caustic solution being maintained between approximately 40° C. to 50° C. for a period of time of approximately 5 minutes; and subjecting the onions to a washing bath to remove substantially all of said root structures, protective skin layers and leaf structures from each of said onion bulbs, and to remove substantially all of the caustic solution from said onion bulbs.

9. The method of processing long day variety harvested onion bulbs without cutting or otherwise disturbing the structural integrity of the interior of the onion bulbs, comprising the steps of: washing the long day harvested onion bulbs to expose the root structures, the protective skin layers and the dried leaf structures at the neck of each onion bulb; immersing the long day onion bulbs in a caustic solution having a concentration in the range of approximately 15% to 20% of caustic solute by weight with the temperature of the caustic solution being maintained between approximately 50° C. to 70° C. for a period of time of approximately 15 minutes; and subjecting the onions to a washing bath to remove substantially all of said root structures, protective skin layers and leaf structures from each of said onion bulbs, and to remove substantially all of the caustic solution from said onion bulbs.

References Cited

UNITED STATES PATENTS 2,766,794   10/1956   O'Dale _____ 146—241

OTHER REFERENCES

Woodroof J. G. et al.: Food Industries; Peeling With Lye (vol. p. 862) 101, June 1948.

Adams et al.: Lye-Pressure Stream Peeling of Potatoes and Other Products. Food Technology 14, January 1960, pp. 1–3.

MAURICE W. GREENSTEIN, Primary Examiner

J. M. HUNTER, Assistant Examiner

U.S. Cl. X.R.

99—186, 193